Figure 5:
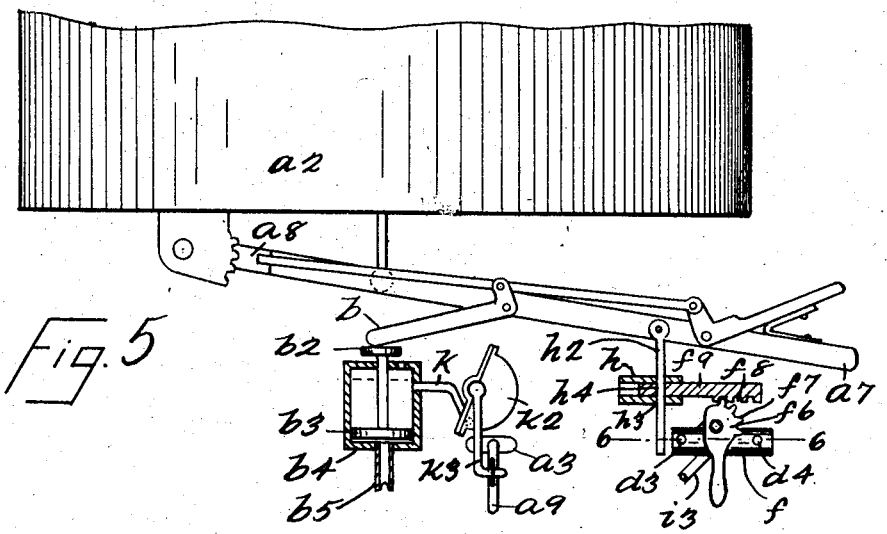

No. 772,444. PATENTED OCT. 18, 1904.
T. J. WALSH.
SAFETY APPARATUS FOR LOCOMOTIVES.
APPLICATION FILED MAY 31, 1904.
NO MODEL. 2 SHEETS—SHEET 1.
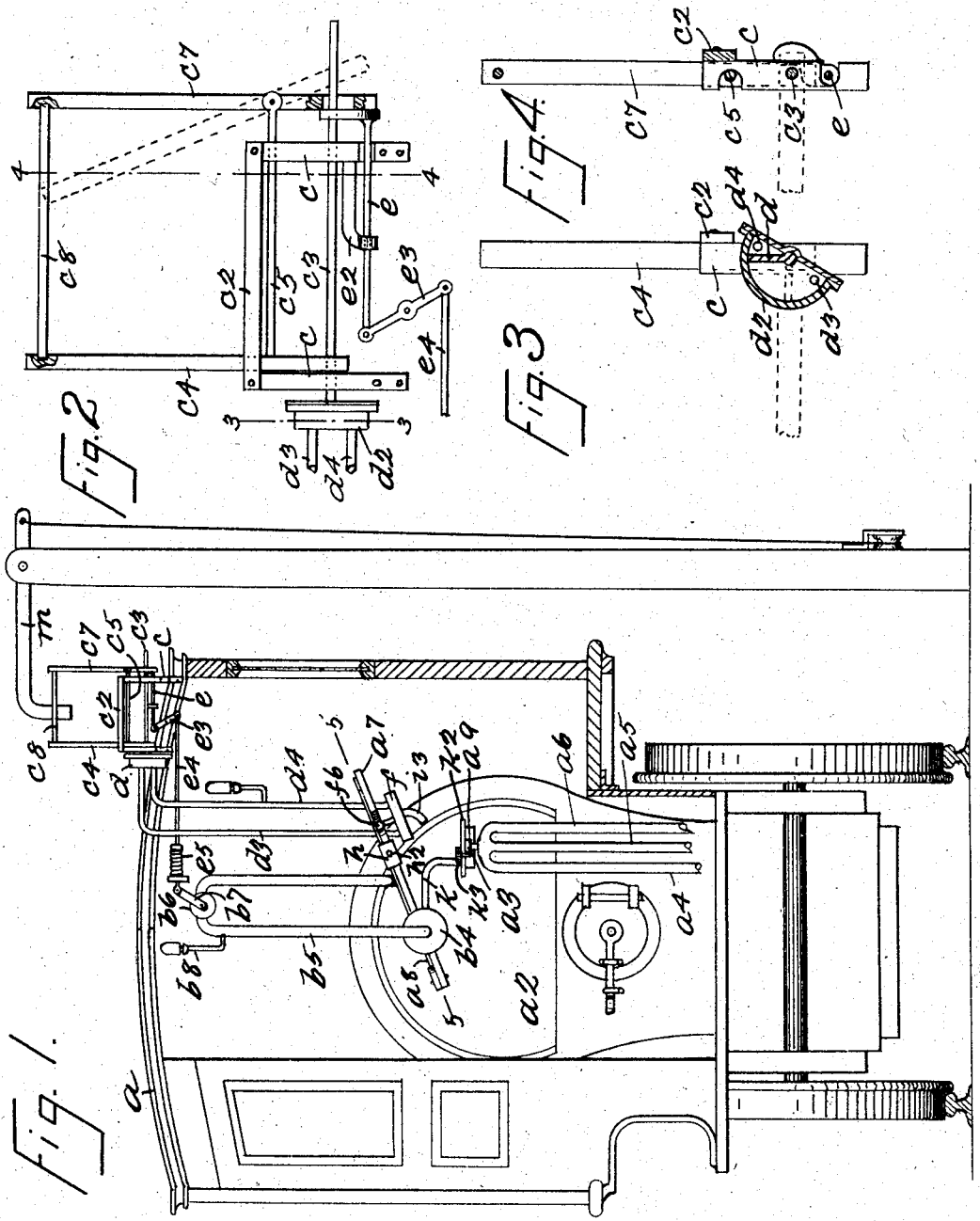
WITNESSES
INVENTOR
Thomas J. Walsh
BY
ATTORNEY No. 772,444. PATENTED OCT. 18, 1904.
T. J. WALSH.
SAFETY APPARATUS FOR LOCOMOTIVES.
APPLICATION FILED MAY 31, 1904.
NO MODEL. 2 SHEETS—SHEET 2.

WITNESSES
Thomas C. Connor
John Barberie

INVENTOR
Thomas J. Walsh
BY
J. Chris Lardla
ATTORNEY

No. 772,444. Patented October 18, 1904.

UNITED STATES PATENT OFFICE.

THOMAS J. WALSH, OF BROOKLYN, NEW YORK, ASSIGNOR TO BARBERIE LOCOMOTIVE APPLIANCE COMPANY, OF NEW YORK, N. Y., A CORPORATION OF NEW YORK.

SAFETY APPARATUS FOR LOCOMOTIVES.

SPECIFICATION forming part of Letters Patent No. 772,444, dated October 18, 1904.

Application filed May 31, 1904. Serial No. 210,360. (No model.)

*To all whom it may concern:*

Be it known that I, THOMAS J. WALSH, a citizen of the United States of America, residing at Brooklyn, in the county of Kings and State of New York, have invented certain new and useful Improvements in Safety Apparatus for Locomotives, of which the following is a specification, such as will enable those skilled in the art to which it appertains to make and use the same.

The object of this invention is to provide an improved safety apparatus for locomotives whereby the steam-supply is cut off and the air-brakes set automatically by a signal arranged along the rails upon which said locomotive moves, a further object being to provide such an apparatus which may be moved out of operative position, if desired, and at the same time making such removal noticeable to persons other than the engineer who so removes it and a still further object being to provide a simple, positive, and economical apparatus for accomplishing these results involving a slide-valve in operative connection with the throttle of the locomotive and with a wing-valve of the part of the apparatus adapted to be operated from without.

My invention is fully described in the following specification, of which the accompanying drawings form a part, in which the separate parts thereof are designated by suitable reference characters in each of the views, and in which—

Figure 6:
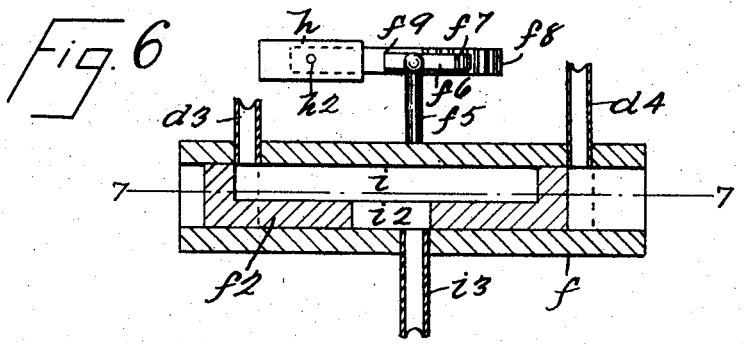
Figure 7:
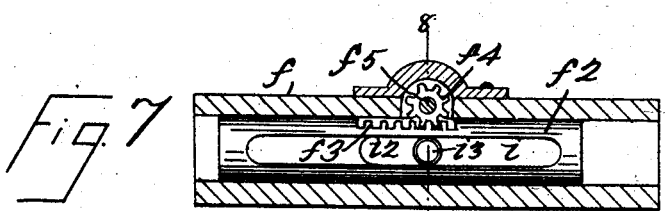
Figure 8:
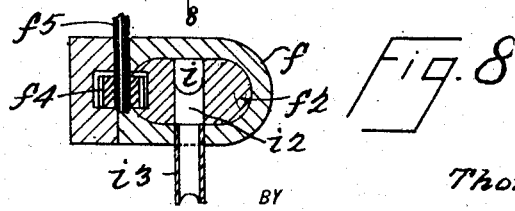

Figure 1 is a rear view of a cab of a locomotive provided with my apparatus; Fig. 2, an enlarged view of a portion of said apparatus; Fig. 3, a section on the line 3 3 of Fig. 2; Fig. 4, a section on the line 4 4 of Fig. 2; Fig. 5, a plan view of a part of the apparatus, taken on the line 5 5 of Fig. 1; Fig. 6, a section on the line 6 6 of Fig. 5; Fig. 7, a section on the line 7 7 of Fig. 6, and Fig. 8 a section on the line 8 8 of Fig. 7.

In the drawings forming part of this specification I have shown a cab $a$ of a locomotive, within which is the usual boiler $a^2$ and engineer's valve $a^3$, with which is connected the usual train-line pipe $a^4$, main reservoir-pipe $a^5$, and exhaust-pipe $a^6$, and the boiler $a^2$ being provided with the usual throttle $a^7$ and latch $a^8$ therefor and the valve $a^3$ being provided with a handle $a^9$.

Connected with the latch $a^8$ is a toggle-lever $b$, to the rear of which is a plate $b^2$, connected to a piston $b^3$, operating in a cylinder $b^4$, and to the rear end of which is connected a supply-pipe $b^5$, the other end of which is connected with the boiler $a^2$, and the passage of steam from the boiler to the cylinder $b^4$ is controlled by a valve $b^6$, provided with a handle $b^7$, and between the valve $b^6$ and the cylinder $b^4$ in the pipe $b^5$ is a whistle $b^8$, and when the valve $b^6$ is opened the steam passing through the pipe to the cylinder blows the whistle, as will be seen.

Mounted in the top of the cab $a$ is a support composed of two uprights $c$ and a cross-piece $c^2$, and passing through the uprights $c$ is a rod $c^3$, to which is secured an arm $c^4$, and to this arm is secured a bar $c^5$, to the outer end of which is pivoted an arm $c^7$, similar to the arm $c^4$, but which is loosely mounted over the rod $c^3$ to permit of movement thereon, and serving to hold the arms $c^4$ and $c^7$ apart at the tops thereof is a member $c^8$ of frangible material, and if this member $c^8$ be removed the arm $c^7$ assumes the position shown in dotted lines in Fig. 2. The rod $c^3$ is rotatable in the uprights $c$ and is secured to a wing $d$, mounted in a segmental casing $d^2$, as shown in Fig. 3, this casing being provided with supply-pipes $d^3$ and $d^4$, one on each side of the wing $d$, and normally the wing is in the position shown in Fig. 3 and held in this position by the steam from the pipe $d^3$; but if this supply be cut off and steam be admitted through the pipe $d^4$ the wing $d$ assumes the position shown in dotted lines in Fig. 3, carrying the arms $c^4$ and $c^7$ with it, and the supply of steam being reversed the arms again resume an upright position.

Bearing against the inner side of the arm $c^7$, at the bottom thereof, is a segmental plate secured a to rod $e$, which is held in a support $e^2$ and to the end of which is connected a lever $e^3$, also connected with a rod $e^4$, the other end of which is pivoted to the handle $b^7$ of the valve $b^6$, and this rod is acted upon by a spring $e^5$, normally forcing the same inwardly, and if the member $c^8$ be removed in any manner from the arms $c^4$ and $c^7$ the arm $c^7$ is forced into the dotted position by the spring $e^5$, which also operates the handle $b^7$ to open the valve $b^6$, and the steam from the boiler is free to pass to the cylinder $b^4$, forces out the piston $b^3$, which releases the latch $a^8$ and closes the throttle and shuts off the steam-supply to the engine of the locomotive.

The pipes $d^3$ and $d^4$ are connected to opposite ends of a cylindrical casing $f$, within which is a slide-valve $f^2$, adapted to be operated by a rack $f^3$ thereon and a gear-wheel $f^4$ in operation therewith, said gear-wheel $f^4$ being secured to a post $f^5$, provided with a handle $f^6$, said handle being provided with a segmental gear $f^7$, engaging a rack $f^8$ on a slide-bar $f^9$, sliding in guides $h$. Pivotally connected with the throttle $a^7$ is a pin $h^2$, which passes into one side of the guide $h$ when in its inner position, and registering with the openings in the guide $h$ and shown at $h^3$ is an opening $h^4$ in the slide-bar $f^9$, through which the pin $h^2$ passes when the throttle is drawn out, as clearly shown in Fig. 5.

The slide-valve $f^2$ is provided with a longitudinal groove $i$, with which is connected centrally a port $i^2$, which communicates with a pipe $i^3$, also connected with the steam-supply of the boiler, and the slide-valve $f^2$ is of a length to communicate the groove $i$ with but one of the pipes $d^3$ and $d^4$ and leaving the other open to the outer air, as shown in Fig. 6, the object being to permit steam to pass through but one of the pipes $d^3$ or $d^4$ at a time, leaving the other for exhausting the steam from the side of the casing $d^2$ toward which the wing $d$ is desired to be moved and admitting steam to the side of this wing to accomplish this movement.

Connected with the cylinder $b^4$ at a point adjacent to the outward position of the piston $b^3$ is a pipe $k$, connected at its other end with a segmental casing $k^2$, similar to the casing $d^2$, already described, and to the wing of which is secured a handle $k^3$, which is connected with the handle $a^9$ of the engineer's valve $a^3$, and when the piston $b^3$ is driven to its outward position steam enters the casing $k^2$ through the pipe $k$, and the handle $k^3$ is operated, and the valve $a^3$ is also operated to open the train-line air-pipe, and thereby set the brakes of the locomotive. It will therefore be seen that if a signal $m$ be set and the engineer does not see the same the member $c^8$ is struck and broken, and the arm $c^7$ being free the spring $e^5$ opens the valve $b^6$, which forces the piston $b^3$ outwardly and closes the throttle and shuts off the steam-supply of the engine of the locomotive, and when the steam is permitted to enter the pipe $k$ the engineer's brake-valve is operated and the brakes set and the train is brought to a stop, and the insertion of another member $c^8$ closes the valve $b^6$ and the throttle and engineer's brake-valve may be moved to their normal positions and the train started. Should the engineer desire to pass the signal, he closes the throttle, which removes the pin $h^2$ from the slide-bar $f^9$ and turns the handle $f^6$, which forces the slide-bar $f^9$ into a position which does not permit of the operation of the throttle and also slides the slide-valve $f^2$ into communication with the pipe $d^4$ and places the pipe $d^3$ into communication with the outer air, permitting the steam in the casing $d^2$ to escape, and thereby moves the wing $d$ and the arms $c^4$ and $c^7$, which operation moves the frangible member $c^8$ out of a position to be struck by the signal $m$, and said signal may be passed, and when the slide-valve $f^2$ is returned to its normal position said arms $c^4$ and $c^7$ resume their upright position, and the throttle may be again drawn out, and the parts are in position for another operation.

It will be evident that various changes in and modifications of the construction herein shown and described may be made without departing from the spirit of my invention or sacrificing its advantages.

Having fully described my invention, and with this reservation, what I claim as new, and desire to secure by Letters Patent, is—

1. In a locomotive comprising the usual boiler, throttle, air-brakes and engineer's valve therefor, devices for closing said throttle, a frangible member, adapted to be externally struck, in operative connection with said devices, a segmental casing in communication with said devices, a wing member radially movable therein, a handle connected with said wing member and with said engineer's valve and adapted to operate the same and set said air-brakes, substantially.

2. In an apparatus of the class described, a segmental casing, in communication with the steam-supply, a wing member radially movable therein and external devices adapted to be operated by the movement of said wing member, substantially.

3. In a locomotive, a movable frame, a frangible member held therein, devices for moving said frame, a valve controlling the operation of said devices, said valve comprising a casing, a supply-pipe centrally arranged at one side thereof, two supplemental pipes opposite said supply-pipe and at either end of said casing, a slide in said casing and provided with recesses adapted to communicate one of said supplemental pipes with said supply-pipe, a rack on said slide, a gear-wheel engaging said rack, a handle connected with said rack and means for locking said handle, substantially.

4. In a locomotive comprising the usual boiler, throttle, air-brakes and engineer's valve therefor, a cylinder and piston therein adapted to close said throttle, a movable frame in operative connection with said cylinder, a frangible member carried by said frame, means connected with said cylinder for closing said engineer's valve, a casing, a radially-movable wing member therein and connected with said frame, a slide-valve in communication with said casing on either side of said wing member and means for locking said slide-valve when said throttle is open and said frame is in its operative position, substantially.

5. In an apparatus of the class described, a throttle, a slide-valve, a handle therefor, a slide-bar provided with an opening normally registering with openings in the guide therefor, a pin on said throttle and in said openings and means connected with said handle for moving said slide-bar, substantially.

In testimony that I claim the foregoing as my invention I have signed my name, in presence of the subscribing witnesses, this 27th day of May, 1904.

THOMAS J. WALSH.

Witnesses:
  JOHN BARBERIE,
  THOMAS C. CONNOR.